United States Patent
Banerjee et al.

(10) Patent No.: US 10,527,516 B2
(45) Date of Patent: Jan. 7, 2020

(54) PASSIVE LEAK DETECTION FOR BUILDING WATER SUPPLY

(71) Applicant: Phyn LLC, Torrance, CA (US)

(72) Inventors: Salil P. Banerjee, Lynchburg, VA (US); Raul I. Ramos-Garcia, Seattle, WA (US); Aanand Esterberg, Seattle, WA (US); Shwetak N. Patel, Seattle, WA (US)

(73) Assignee: Phyn LLC, Torrance, CA (US)

( * ) Notice: Subject to any disclaimer, the term of this patent is extended or adjusted under 35 U.S.C. 154(b) by 158 days.

(21) Appl. No.: 15/818,562

(22) Filed: Nov. 20, 2017

(65) Prior Publication Data

US 2019/0154539 A1    May 23, 2019

(51) Int. Cl.
   *G01M 3/28* (2006.01)
   *G01M 3/00* (2006.01)
(52) U.S. Cl.
   CPC .......... *G01M 3/2807* (2013.01); *G01M 3/002* (2013.01); *G01M 3/007* (2013.01)
(58) Field of Classification Search
   CPC ..... G01M 3/2807; G01M 3/002; G01M 3/007
   See application file for complete search history.

(56) References Cited

U.S. PATENT DOCUMENTS

| | | |
|---|---|---|
| 2,991,481 A | 7/1961 | Book |
| 4,313,595 A | 2/1982 | Mark |
| 4,488,567 A | 12/1984 | Grant |
| 4,637,423 A | 1/1987 | Gray |
| 4,719,939 A | 1/1988 | Killian |
| 4,804,957 A | 2/1989 | Selph et al. |
| 4,858,141 A | 8/1989 | Hart et al. |
| 5,004,014 A | 4/1991 | Bender |
| 5,038,821 A | 8/1991 | Maget |
| 5,158,483 A | 10/1992 | Fishman et al. |

(Continued)

FOREIGN PATENT DOCUMENTS

| | | |
|---|---|---|
| CN | 1809738 A | 7/2006 |
| DE | 102007032053 A1 | 1/2009 |

(Continued)

OTHER PUBLICATIONS

International Search Report and Written Opinion PCT/US2009/053848 dated Apr. 1, 2010, all pages.

(Continued)

*Primary Examiner* — Paul M. West
(74) *Attorney, Agent, or Firm* — Kilpatrick Townsend & Stockton LLP

(57) ABSTRACT

A method and system for detecting small leaks in a plumbing system is disclosed. A temperature sensor coupled to the water in the plumbing system is used to determine if there is a leak. During times of inactivity for fixtures in the plumbing systems, a flow sensor might measure usage of water that would indicate a leak. For very small leaks, the flow is below a minimum measurable flow of the flow sensor. Embodiments of the invention measure temperature of water within a pipe coupled to the plumbing system. Temperature will generally decay in a particular predicable way when there is flow as the temperature of water upon entry to the building is lower than the air temperature within the building. Signal processing, machine learning and/or statistical approaches are used to analyze the temperature and optionally flow and/or pressure over time to determine when a leak is likely.

20 Claims, 11 Drawing Sheets

(56) References Cited

U.S. PATENT DOCUMENTS

| | | |
|---|---|---|
| 5,287,876 A | 2/1994 | Takahashi |
| 5,409,037 A | 4/1995 | Wheeler |
| 5,441,070 A | 8/1995 | Thompson |
| 5,483,838 A | 1/1996 | Holden |
| 5,568,825 A | 10/1996 | Faulk |
| 5,635,895 A | 6/1997 | Murr |
| 5,660,198 A | 8/1997 | McClaran |
| 5,875,812 A | 3/1999 | Miller |
| 5,927,400 A | 7/1999 | Bononi et al. |
| 5,971,011 A | 10/1999 | Price |
| 6,206,337 B1 | 3/2001 | Veillet, Jr. |
| 6,273,686 B1 | 8/2001 | Kroell et al. |
| 6,539,968 B1 | 4/2003 | White |
| 6,568,416 B2 | 5/2003 | Tucker et al. |
| 6,662,821 B2 | 12/2003 | Jacobsen et al. |
| 6,701,951 B1 | 3/2004 | Drinkwater |
| 6,728,646 B2 | 4/2004 | Howell et al. |
| 6,763,843 B1 | 7/2004 | Dickerson et al. |
| 6,789,411 B2 | 9/2004 | Roy |
| 6,839,644 B1 | 1/2005 | Woods et al. |
| 6,853,291 B1 | 2/2005 | Aisa |
| 6,860,288 B2 | 3/2005 | Uhler |
| 6,869,644 B2 | 3/2005 | Buhay et al. |
| 6,963,808 B1 | 11/2005 | Addink et al. |
| 6,987,457 B2 | 1/2006 | Yin et al. |
| 6,993,417 B2 | 1/2006 | Osann, Jr. |
| 7,043,380 B2 | 5/2006 | Rod |
| 7,049,976 B2 | 5/2006 | Hunt et al. |
| 7,066,192 B1 | 6/2006 | Delaney et al. |
| 7,119,698 B2 | 10/2006 | Schleich et al. |
| 7,276,915 B1 | 10/2007 | Euler et al. |
| 7,304,587 B2 | 12/2007 | Boaz |
| 7,317,404 B2 | 1/2008 | Cumeralto et al. |
| 7,330,796 B2 | 2/2008 | Addink et al. |
| 7,360,413 B2 | 4/2008 | Jeffries et al. |
| 7,383,721 B2 | 6/2008 | Parsons et al. |
| 7,400,986 B2 | 7/2008 | Lathan et al. |
| 7,460,930 B1 | 12/2008 | Howell et al. |
| 7,493,221 B2 | 2/2009 | Caggiano et al. |
| 7,508,318 B2 | 3/2009 | Cassella et al. |
| 7,541,941 B2 | 6/2009 | Bogolea et al. |
| 7,546,214 B2 | 6/2009 | Rivers et al. |
| 7,710,282 B1 | 5/2010 | Young |
| 7,711,454 B2 | 5/2010 | Addink et al. |
| 7,719,257 B2 | 5/2010 | Robarge et al. |
| 7,920,983 B1 | 4/2011 | Peleg et al. |
| 7,966,099 B2 | 6/2011 | Fima |
| 7,969,318 B2 | 6/2011 | White et al. |
| 8,201,457 B1 | 6/2012 | Halilah |
| 8,457,908 B2 | 6/2013 | Patel et al. |
| 8,701,703 B2 | 4/2014 | Scott et al. |
| 9,016,662 B2 | 4/2015 | Staffiere et al. |
| 9,019,120 B2 | 4/2015 | Broniak et al. |
| 9,250,105 B2 | 2/2016 | Patel et al. |
| 9,719,234 B1 | 8/2017 | Samvinesh et al. |
| 9,759,632 B2 | 9/2017 | Shaw et al. |
| 2001/0003286 A1 | 6/2001 | Philippbar et al. |
| 2003/0088527 A1 | 5/2003 | Hung et al. |
| 2004/0128034 A1 | 7/2004 | Lenker et al. |
| 2004/0140908 A1 | 7/2004 | Gladwin et al. |
| 2004/0163705 A1 | 8/2004 | Uhler |
| 2004/0206405 A1 | 10/2004 | Smith et al. |
| 2005/0016592 A1 | 1/2005 | Jeromson et al. |
| 2005/0067049 A1 | 3/2005 | Fima et al. |
| 2005/0126635 A1 | 6/2005 | Addink et al. |
| 2006/0028355 A1 | 2/2006 | Patterson et al. |
| 2006/0202051 A1 | 9/2006 | Parsons et al. |
| 2007/0289635 A1 | 12/2007 | Ghazarian et al. |
| 2008/0086394 A1 | 4/2008 | O'Neil et al. |
| 2008/0184781 A1 | 8/2008 | Mulligan et al. |
| 2008/0255782 A1 | 10/2008 | Bilac et al. |
| 2008/0295895 A1 | 12/2008 | Vincent et al. |
| 2008/0300803 A1 | 12/2008 | Drake et al. |
| 2009/0043427 A1 | 2/2009 | Addink |
| 2009/0072985 A1 | 3/2009 | Patel et al. |
| 2010/0241367 A1 | 9/2010 | Yada et al. |
| 2010/0313958 A1 | 12/2010 | Patel et al. |
| 2011/0114202 A1 | 5/2011 | Goseco |
| 2011/0178644 A1 | 7/2011 | Picton |
| 2012/0180877 A1 | 7/2012 | Pallais |
| 2014/0026644 A1 | 1/2014 | Patel et al. |
| 2014/0130878 A1 | 5/2014 | Marinez |
| 2014/0230925 A1 | 8/2014 | Halimi |
| 2016/0348802 A1 | 12/2016 | Halimi et al. |
| 2017/0131174 A1 | 5/2017 | Enev et al. |
| 2017/0138023 A1 | 5/2017 | Dooley et al. |
| 2017/0159267 A1 | 6/2017 | Halimi |
| 2017/0261394 A1 | 9/2017 | Halimi |
| 2017/0362801 A1 | 12/2017 | Van Goor et al. |
| 2018/0010978 A1 | 1/2018 | Bailey |

FOREIGN PATENT DOCUMENTS

| | | |
|---|---|---|
| JP | 200-5337932 A | 12/2005 |
| WO | 2008-128127 A1 | 10/2008 |
| WO | 2010-007369 A2 | 1/2010 |
| WO | 2014/066764 A1 | 5/2014 |

OTHER PUBLICATIONS

Arregui, et al. Evaluating Domestic Water Meter Accuracy: A Case Study. 343-352, 2003.

Arroyo, et al. Waterbot: Exploring Feedback and Persuasive Techniques at the Sink. CHI 2005-Papers: Technology in the Home: 631-639, 2005.

Beckmann, et al. Some Assembly Required: Supporting End-User Sensor Installation in Domestic Ubiquitous Computing Environments. UbiComp 2004: 107-124, 2004.

Brandon, et al. Reducing Household Energy Consumption: A Qualitative and Quantitative Field Study. Journal of Environmental Psychology: 75-85, 1999.

Brumitt, et al. EasyLiving: Technologies for Intelligent Environments. Proceedings of the International Symposium on Handheld and Ubiquitous Computing: 12-29, 2000.

Chen, et al. Bathroom Activity Monitoring Based on Sound. Pervasive, LNCS 3468: 47-61, 2005.

Chetty, et al. How Smart Homes Learn: The Evolution of the Networked Home and Household. UbiComp 2007: 127-144, 2007.

Evans, et al. Flow Rate Measurements Using Flow-Induced Pipe Vibration. Journal of Fluids Engineering, vol. 126, No. 2: 280-285, 2004.

Fischer. Feedback on Household Electricity Consumption: A Tool for Saving Energy? Energy Efficiency: 79-104, 2008.

Fogarty, et al. Sensing from the Basement: A Feasibility Study of Unobtrusive and Low-Cost Home Activity Recognition. UIST'06, Switzerland, Oct. 15-18, 2006.

Fogarty, et al. Sensing from the Basement: A Feasibility Study of Unobtrusive and Low-Cost Home Activity Recognition. UIST 2006: 91-100, 2006.

Froehlich, et al. HydroSense: Infrastructure-Mediated Single-Point Sensing of Whole-home Water Activity. Ubicomp 2009: 235-244, 2009.

Froehlich, et al. Sensing Opportunities for Personalized Feedback Technology to Reduce Consumption. UW CSE Technical Report: CSE 09-13-01: 7 pp., 2009.

Froehlich, et al. The Design of Eco-Feedback Technology. CHI 2010: 10 pp., 2010.

Froehlich. Sensing and Feedback of Everyday Activities to Promote Environmentally Sustainable Behaviors. Thesis Proposal, Computer Science and Engineering, University of Washington: 35 pp., 2009.

Hirsch, et al. The ELDer Project: Social, Emotional, and Environmental Factors in the Design of Eldercare Technologies. Conference on Universal Usability 2000: 72-79, 2000.

Horst. Whirlpool Corporation: Woodridge Energy Study and Monitoring Pilot. 1-99, 2006.

Kim, et al. ViridiScope: Design and Implementation of a Fine Grained Power Monitoring System for Homes. UbiComp 2009: 245-254, 2009.

(56) References Cited

OTHER PUBLICATIONS

Kim, et al., NAWMS: Nonintrusive Autonomous Water Monitoring System. SensSys '08 309-321, Nov. 5-7, 2008.

Lowenstein, et al. Disaggregating Residential Hot Water Use, American Society of Heating, Refrigerating, and Air-Conditioning Engineers (ASHRAE) Transactions: Symposia 1019-1027, 1996.

Oppenheim, et al. From Frequency to Quefrency: A History of the Cepstrum. IEEE Signal Processing Magazine, vol. 21, No. 5: 95-106, 2004.

Tapia. et al. The Design of a Portable Kit of Wireless Sensors for Naturalistic Data Collection. Pervasive: 117-134, 2006.

Ueno, et al. Effectiveness of Displaying Energy Consumption Data in Residential Houses—Analysis on how the Residents Respond. ECEEE 2005 Summer Study—What Works and Who Delivers?: 1289-1299, 2005.

Wilson, et al. Simultaneous Tracking & Activity Recognition (STAR) Using Many Anonymous Binary Sensors. Pervasive: 62-79, 2005.

Wren, et al. Toward Scalable Activity Recognition for Sensor Networks. LoCA: 168-185, 2006.

International Search Report and Written Opinion dated Jan. 31, 2019 in App. No. PCT/US2018/059772, all pages.

Leak

No Leak

PASSIVE LEAK DETECTION FOR BUILDING WATER SUPPLY

BACKGROUND

This disclosure relates in general to detecting pipe leaks and, but not by way of limitation, to use of in-line sensors for detection of small leaks.

Homes and commercial buildings have water distributed throughout with various pipes and egress regulated with plumbing fixtures. It is not uncommon for there to be leaks as there are multiple points of failure in any water distribution system. For example, water pipes exposed to freezing temperatures are prone to bursting with the expansion of ice. Leaks cause tremendous property damage, promote toxic mold growth and needlessly waste water.

Detection of leaks in plumbing is notoriously difficult. Often the first sign of a problem is flooding. There are flow sensors that measure movement of liquid, but detection of leaks, especially small ones, is a vexing problem. Although a small leak may never result in noticeable flooding, it can nurture growth of toxic mold and eventually progress to a large leak causing various water damage.

SUMMARY

Embodiments the plumbing analyzer use temperature and/or pressure sensors to determine when minute flows are occurring in the plumbing. One or more temperature and pressure sensors are thermally coupled to the liquids within the plumbing. Different configuration plumbing systems may use different algorithms to process the temperature and/or pressure sensor information to accurately detect leaks. Signal processing of the temperature sensor and optionally pressure and/or flow sensors allow recognizing when a minute flow in the pipe is most likely a leak and not normal usage. Some embodiments use pressure sensing to spectrally determine when there is a leak in the plumbing system.

In one embodiment, the present disclosure provides a method and system for detecting small leaks in a plumbing system. Temperature sensor(s) and/or pressure sensor(s) coupled to the water in the plumbing system is used to determine if there is a leak. During times of inactivity for fixtures in the plumbing systems, a flow sensor might measure usage of water that would indicate a leak. For very small leaks, the flow is below a minimum measurable flow of the flow sensor. Embodiments of the invention measure temperature of water within a pipe coupled to the plumbing system. Temperature will generally decay in a particular predicable way when there is flow as the temperature of water upon entry to the building is lower than the air temperature within the building. Similarly, pressure will generally decay in certain plumbing system configurations as the leak depletes water from the pipes. Spectral analysis of the pressure data can detect changes in the spectra associated with the leak in some plumbing systems. Signal processing, machine learning and/or statistical approaches are used to analyze the temperature and optionally flow and/or pressure over time to determine when a leak is likely.

In one embodiment, a method for detecting small leaks of liquid in a plumbing system is disclosed. Liquid flow is measured within a pipe of the plumbing system with a flow sensor. Determining algorithmically using the flow sensor that there is no intentional liquid egress from the plumbing system with an open water fixture. A temperature of the liquid is measured over time at a point in the plumbing system upstream from a leak while there is no intentional liquid egress and no measured flow with the flow sensor. Measuring temperature over time to determine decay of the measured temperature exceeds threshold decay of liquid in the plumbing system. A leak detected signal is transmitted when the decay exceeds a threshold decay.

Some embodiments use signal processing techniques to match the measured temperature to a leak profile. Other embodiments, measure temperature at a second point of the plumbing system and process a second measured temperature at the second point before correcting the processing the measured temperature using the second measured temperature. In some installations, the measuring temperature at the second point is measuring air temperature away from the liquid.

One embodiment determines air temperature within a building hosting the plumbing system, where the decay is a function of the air temperature. A thermal mass of the plumbing system can be determined over time to determine the predicted decay. In one embodiment, the flow through the leak in the pipe is below a perceptible limit of the flow sensor.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
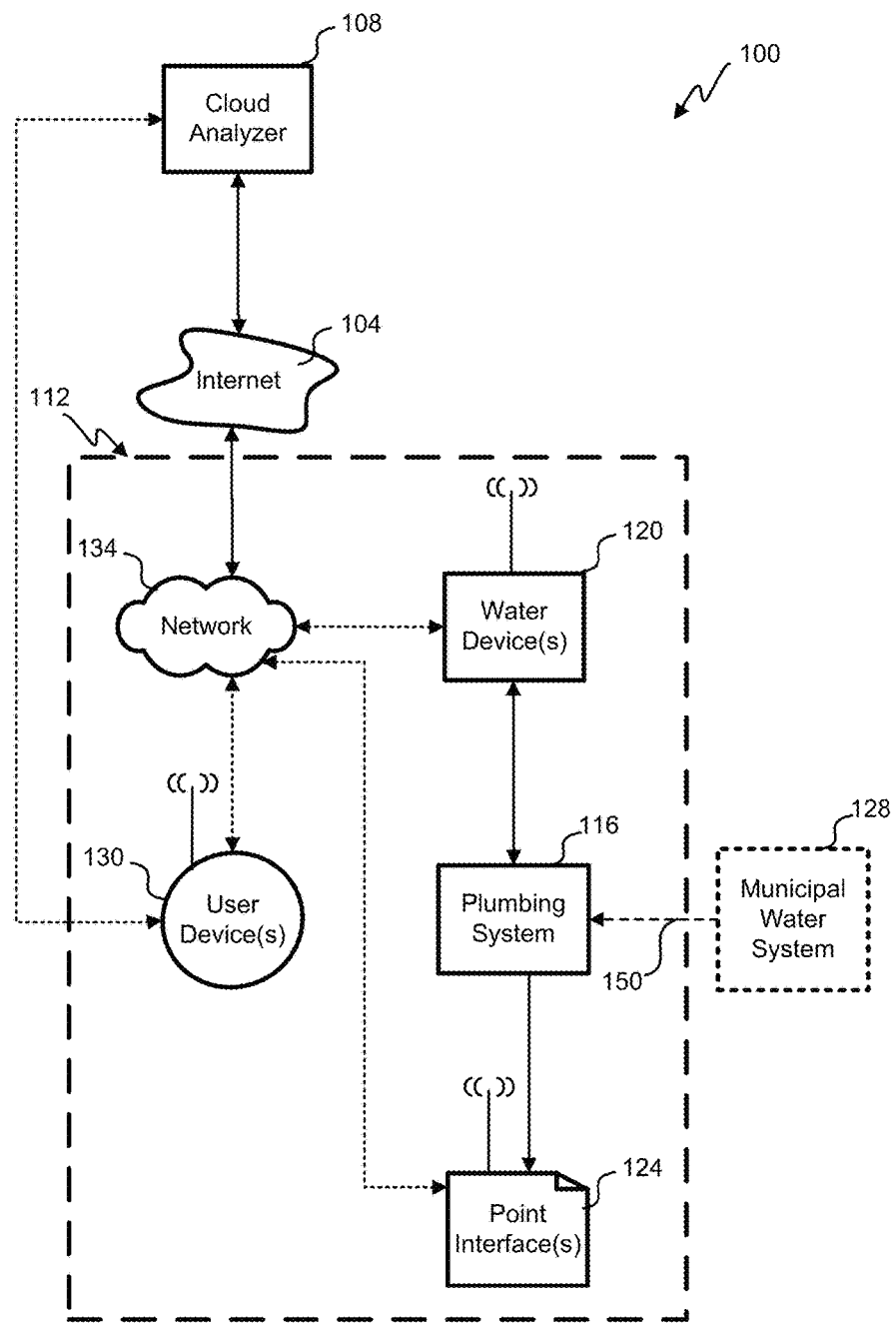
FIG. 1 depicts a block diagram of an embodiment of a water analysis system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

A plumbing analyzer finds small leaks that are not detected by a conventional flow sensor. For example, turbine flow meters don't sense below 0.7 gpm and ultrasonic flow sensors have resolution down to 0.1-0.2 gpm. Statistical approaches and signal processing techniques process temperature readings for the leak detection by relying on variations of the temperature signal to provide first insights into the possibility of a leak with pressure and/or flow sensing optionally assisting in validating the likelihood of a leak in a plumbing system. Embodiments allow detection of leaks below 0.7 gpm and as low as 0.06 gpm.

When water is stagnant in the pipes (i.e., there is no intentional water egress or leaks) the temperature of water varies based on the location the water device is installed and the temperature of the water supply entering the building. Where the water device is installed inside a building, for example, the temperature will stabilize at the ambient temperature typically regulated by a HVAC thermostat. On the other hand, if the plumbing analyzer is placed outdoors it will vary as the weather changes over the course of the day. For small flows that are not detected by conventional flow sensors, there is a change in the temperature noted by the plumbing analyzer. Depending on the rate of water flow the temperature stabilizes at a certain temperature.

The city supplied water temperature varies relatively slowly since they are typically delivered via pipes which are buried underground. Since these pipes are buried underground there is less variation in temperature as compared to the atmospheric temperature. Ground water temperatures vary slightly from around 40 to 55° F. (4 to 13° C.). Such temperature changes are dependent upon well depth and aboveground storage facilities. Surface water temperatures vary with seasonal change from around 40 to 80° F. (4 to 27° C.) with even higher temperatures in the deep South and Southwest. It can be said that the city supplied water temperature remains relatively stable during a given season for a given location (Temperature varies from 38° F. in Anchorage, Ak. to 82° F. in Phoenix, Ariz.). The temperature changes noted by the water device are due to water flowing through the pipes and can help detect small unintended water usages or leaks continuously without engaging the shut-off-valve or other techniques that actively engage the plumbing system as described in application Ser. No. 15/344,458, Entitled "SYSTEM AND METHOD FOR LEAK CHARACTERIZATION AFTER SHUTOFF OF PRESSURIZATION SOURCE," filed on Nov. 4, 2016, which is incorporated by reference for all purposes.

Pressure in the plumbing system can be analyzed with the water device. The municipal water system is pressurized so that the plumbing fixtures dispense water when opened. The water main into the building is typically at 80-120 psi. Most buildings buffer the water main pressure with a pressure reducing valve (PRV) to lower the pressure to 40-70 psi, which also isolates noise seen with sensors when connected directly to the water main. Within the building, temperature and pressure will stabilize at a given rate of flow caused by leak or other egress from the plumbing system even for situations with the flow sensor cannot perceive anything.

Referring first to FIG. 1, a block diagram of an embodiment of a water analysis system 100 is shown. The municipal water system 128 is connected to the building 112 with a water main 150, but other embodiments could source their water from a well, a cistern, a tank, or any other source. Different water sources may use different flow and leak detection algorithms.

Remote from the building 112 over the Internet 104 is a cloud analyzer 108 that is in communication with various buildings and user devices 130. User account information, sensor data, local analysis, municipal water usage information for the building 112 is passed to the cloud analyzer 108. User devices 130 may connect with the water device 120 and the cloud analyzer through a local network 134 and/or a cellular network. The water device 120 can have an Ethernet, a broadband over power line, a WiFi, and/or a cellular connection coupled to the cloud analyzer 108. Some embodiments include a gateway or peer node that the water device can connect to that is coupled to the network 134 and/or Internet 104 using WiFi, Bluetooth, Zigbee, or other short range wireless signals. Generally, there is a gateway or firewall between the network 134 and the Internet 104.

Within the building 112, the plumbing system 116 is a collection of pipes connected to appliances and fixtures all coupled to the water main 150. A building may have one or more water device(s) 120 in fluid communication with the plumbing system 116. A water device 120 may be coupled to the cold and/or hot water pipe at a particular location and wirelessly or wire communicates with the network 134.

One or more point interface(s) 124 may or may not be in fluid communication with the plumbing system, but can gather data in some embodiments such as ambient temperature, temperature outside the pipe, and/or acoustic waves inside or outside the pipe. The point interfaces 124 are coupled to the network 134 to allow input and output to the user with an interface. The point interface may be separate from the plumbing system 116 altogether while providing status on the water analysis system 100 such as instantaneous water usage, water usage over a time period, water temperature, water pressure, etc. Error conditions such as leaks, running toilets or faucets, missing or defective PRV, water bill estimates, low pressure, water heater malfunction, well pump issues, and/or other issues with the plumbing system 116 can be displayed at the point interfaces 124.

The user device 130 can be any tablet, cellular telephone, web browser, or other interface to the water analysis system 100. The water device 120 is enrolled into a user account with the user device 130. All the information available at a point interface 124 can be made available to the user device using an application, app and/or browser interface. The user device 130 can wired or wirelessly connect with the water device(s) 120, cloud analyzer 108, and/or point interface(s) 124.

Figure 2:
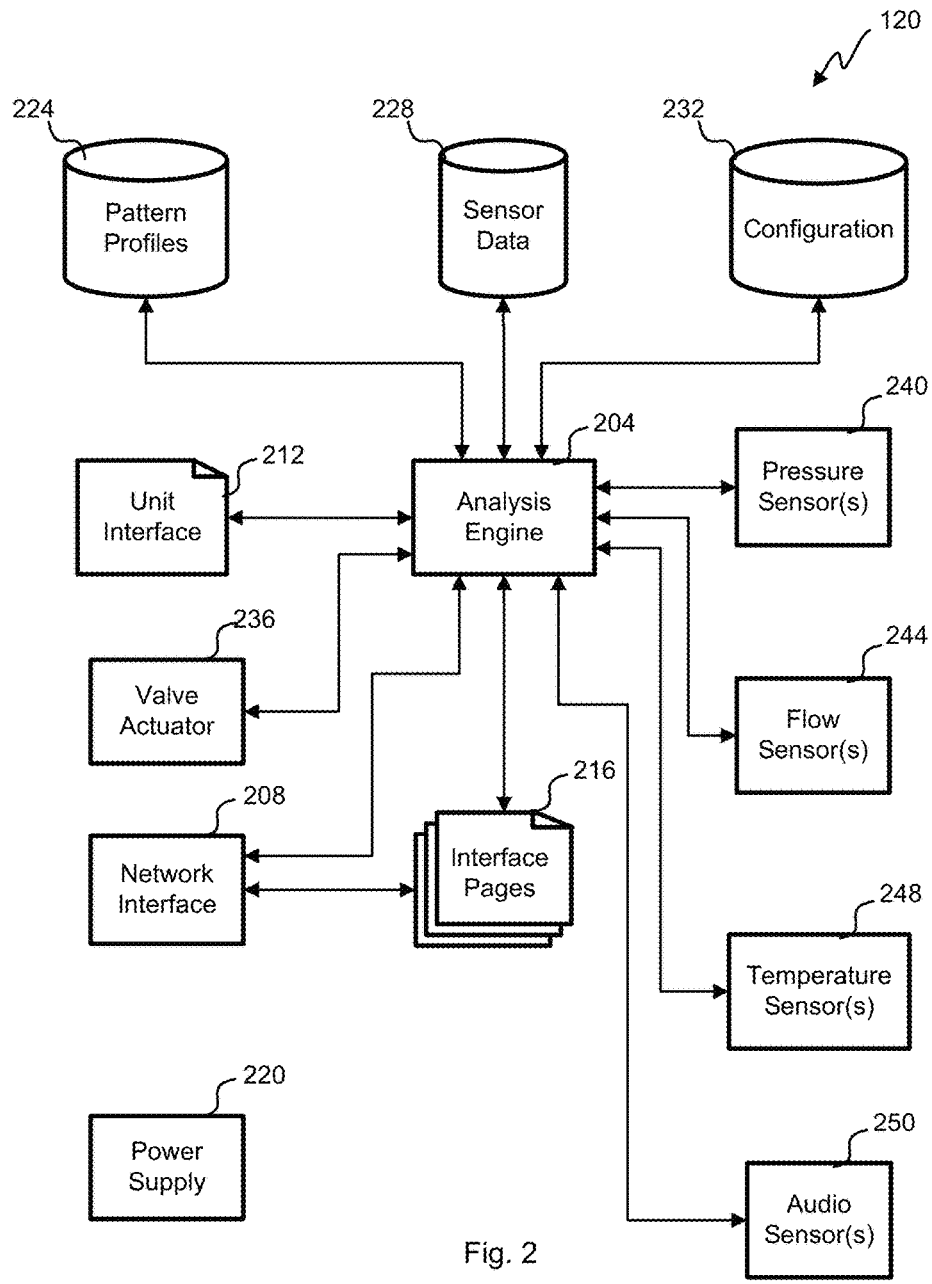
FIG. 2 depicts a block diagram of an embodiment of a water device.

With reference to FIG. 2, a block diagram of an embodiment of a water device 120 is shown. A power supply 220 could be internal or external to the water device 120 to provide DC power to the various circuits. In some embodiments, a replaceable battery provides power while other embodiments use the water pressure to drive a turbine that recharges a battery to provide power.

An analysis engine 204 gathers various data from the pressure sensor(s) 240, flow sensor(s) 244, temperature sensor(s) 248, and optionally audio sensor(s) 250. Interface pages 216 allow interaction with the water device 120 through a network interface 208 in a wired or wireless fashion. The analysis engine 204 also supports a unit interface 212 that is physically part of the water device 120 to display various status, information and graphics using an OLED, LED, LCD display and/or status lights or LEDs.

Various information is stored by the water device 120, which may be reconciled with the cloud analyzer 108 in-whole or in-part using the network interface 208. Sensor data for the various sensors 240, 244, 248, 250 are stored in the sensor data store 228 over time to allow for longitudinal analysis. For example, several hours through several days of sensor data can be stored. The granularity of readings and length of time stored may be predefined, limited by available storage or change based upon conditions of the plumbing system 116. For example, data samples every second over a two day period could be stored, but when a leak is suspected the sample rate could increase to 60 times a second for 4 hours of time.

When fixtures or appliances interact with the water in the plumbing system 116, repeating patterns occur at the water device 120. Pattern profiles 224 are stored to quickly match current sensor readings to known events. For example, a particular faucet when used may cause the flow, pressure and/or temperature sensor 244, 240, 248 readings to fluctuate in a predictable manner such that the pattern profile can be matched to current readings to conclude usage is occurring. Application Ser. No. 14/937,831, entitled "WATER LEAK DETECTION USING PRESSURE SENSING," filed on Nov. 10, 2015, describes this analysis and is incorporated by reference for all purposes. The pattern profiles 224 can be in the time domain and/or frequency domain to support various condition matching by the analysis engine 204. Both intentional egress and leaks have pattern profiles 224 that are stored.

A configuration database 232 stores information gathered for the water device 120. The Table depicts water supply parameters stored in the configuration database 232. Type of plumbing system 116 includes those without a PRV, well water, working PRV, and non-functional PRV. The water supply to the water main 150 can be from the municipal water system 128, a well, a water tank, or other source. The configuration database 232 can be automatically populated using algorithms of the analysis engine 204 or manually entered by the user device 130. Different fixtures and appliances connected to the plumbing system 116 are noted in the configuration database 232.

TABLE

| Water Supply | |
|---|---|
| Field | Options |
| Type | No PRV |
| | Well water |
| | Working PRV |
| | Non-Functional PRV |
| Supply | Municipal water |
| | Well |
| | Tank |

Figure 3:
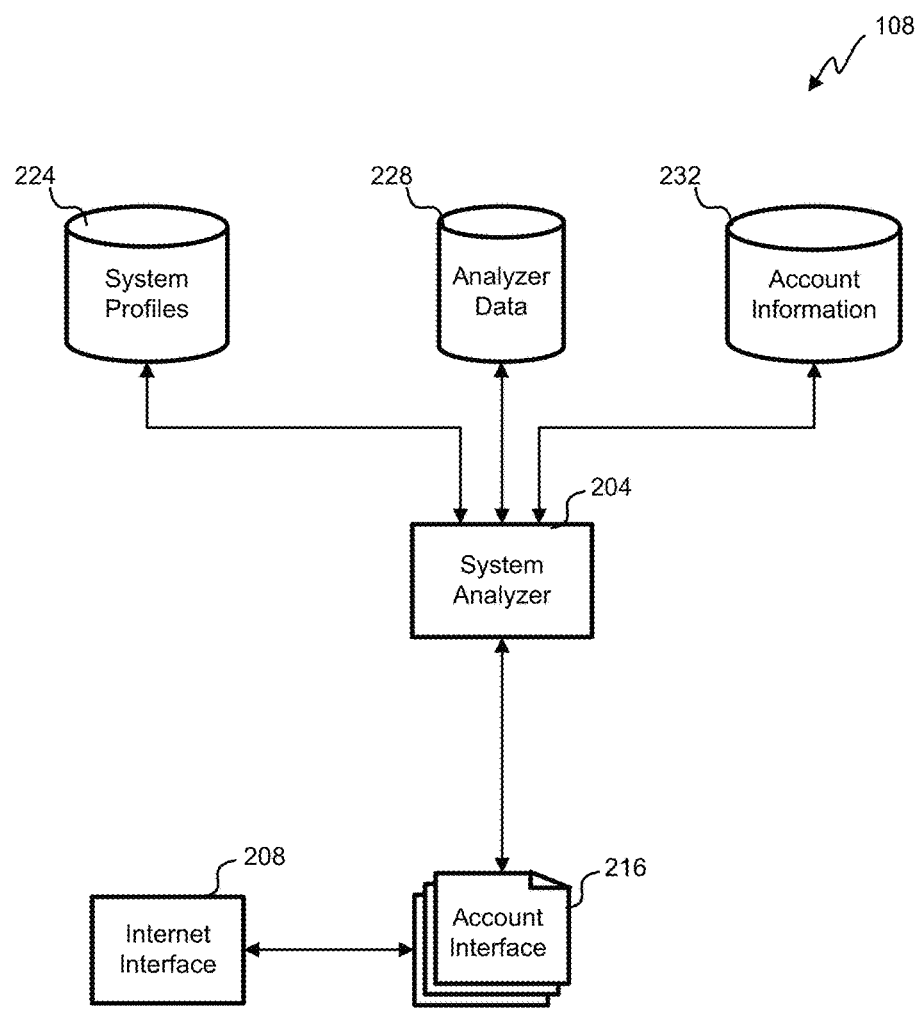
FIG. 3 depicts a block diagram of an embodiment of a cloud analyzer.

Referring next to FIG. 3, a block diagram of an embodiment of a cloud analyzer 108 is shown. The cloud analyzer 108 receives data and configuration information from many buildings 112 throughout the water analysis system 100. Each building 112 has a system profile 224 that is stored including the fixtures, appliances, water device(s) 120, point interface(s) 124, type of water supply, water source type are stored. Account information 232 including login credentials, building location, and user demographic information is also stored. Gathered sensor data in raw and processed form is stored as analyzer data 228 and could include usage history, specific egress events, leaks detected, etc.

The system analyzer 204 can process the data from each building 112 to find patterns corresponding to leaks, malfunctions, and other events that are not recognized by the water device 120 locally. The system analyzer 204 can access any water device 120 or point interface 124 to test functionality, update software, and gather data. Where a user device 130 is coupled to the cloud analyzer 108, the system analyzer 204 receives commands to perform requested tasks. For example, the user device 130 can query for usage on a per fixture or appliance basis. Overall usage can also be determined. The system analyzer 204 can access the water utility usage and billing to provide insights into costs and overall consumption. For those utilities that provide usage information in real time, the usage and cost can be determined for each use of the plumbing system 116.

An account interface 216 allows various water devices 120 and user devices 130 to interact with the cloud analyzer 108 through an internet interface 208. The cloud analyzer 108 provides historical and real time analysis of buildings 118 a user is authorized to access. Various interaction pages allow entry of plumbing system information, configuration parameters, building location and user demographic information. Various reports and status parameters are presented to the user device through the account interface 216.

Figure 4:
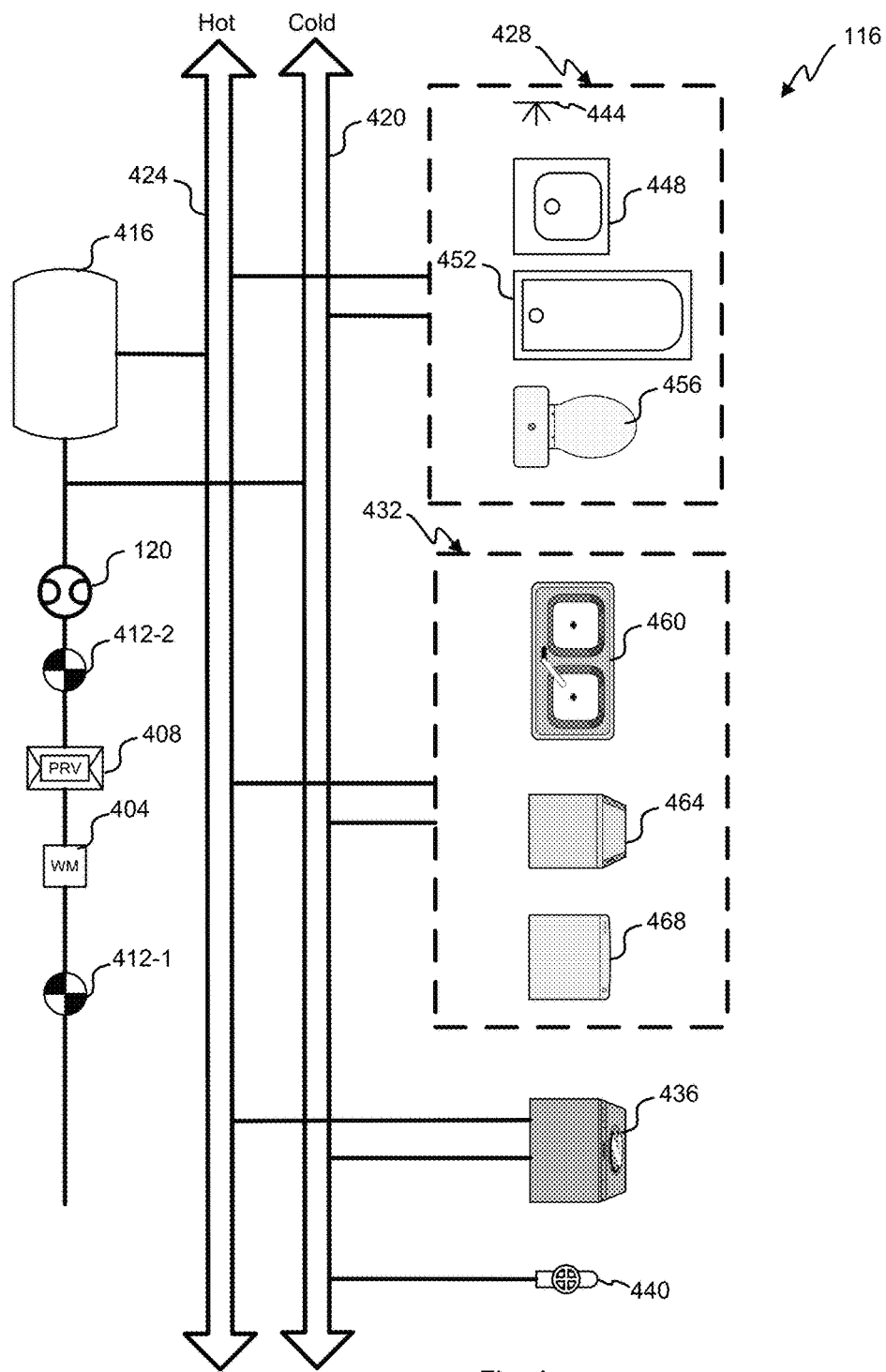
FIG. 4 depicts a block diagram of an embodiment of a plumbing system.

With reference to FIG. 4, a block diagram of an embodiment of a plumbing system 116 is shown. The municipal water system 128 is connected to a main shutoff valve 412-1 before the water main passes through a water meter 404 provided by the municipality for billing purposes.

The water meter 404 may be electronically or manually read to determine the bill, but some embodiments allow real time reading of the water meter 404 electronically.

Building codes often require use of a PRV 408, but not universally. Older homes may also be missing a PRV, have one that no longer functions properly or have less than 80 psi supplied by the municipal water system 128. A building shutoff valve 412-2 is often located interior to the building 112 and provides another place to close off the water main. A water device 120 is located after the building shutoff valve 412-2, but before a water heater 416 in this embodiment. The water device 120 can be placed under the sink, near an appliance or any other location where fluid coupling is convenient along with a source of power is nearby. The hot water pipes 424 provide heated water to the building 118 and the cold water pipes 420 provide unheated water varying between the ambient temperature in the building 112 and the temperature of the municipal water system 128.

This embodiment has a single bathroom 428, a kitchen 432, a washing machine 436, and a water spigot 440, but other embodiments could have more or less fixtures and appliances. The bathroom 428 has a shower 444, sink 448, bathtub 452, and toilet 456 that use water. The sink 448, bathtub 452, and shower 444 are all hooked to both the hot and cold water pipes 424, 420. The toilet 456 only requires cold water so is not hooked to the hot water supply.

The kitchen 432 includes a two-basin sink 460, a refrigerator with liquid/ice dispenser, and a dishwasher. The refrigerator only receives cold water 420, but the two-basin sink 460 and dishwasher 468 receive both cold and hot water 420, 424. Kitchens 432 commonly include single-basin sinks and other appliances that might be coupled to the water.

Figure 5:
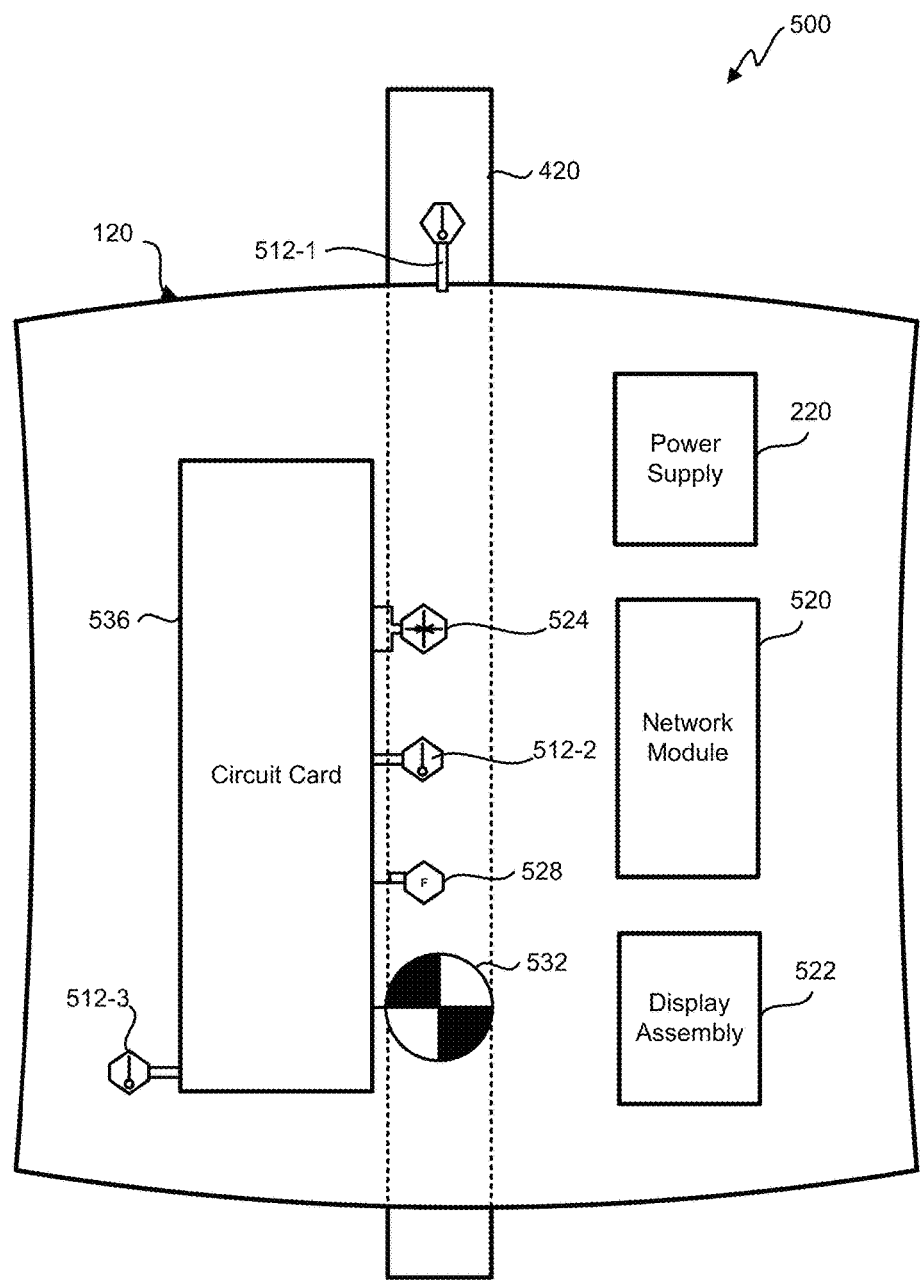
FIG. 5 depicts a diagram of an embodiment of an installed water device.

Referring next to FIG. 5, a diagram of an embodiment of an installed water device 500 is shown. The water device 120 passes water through a pipe 420 that is integral to the water device 120 and attached on both ends to either a hot or a cold water line. The integral portion of the pipe 420 could be made of copper, PVC, plastic, or other building pipe material and could be mated to the plumbing system 116 with soldered joints, glued joints, and/or detachable and flexible hoses.

There are several modules that make up the water device 120. The power supply 220 powers the water device 120 and could be internal or external to the enclosure. A network module 520 includes the network interface 208 to allow wired or wireless communication with the network 134 and Internet 104 to other components of the water analysis system 100. A display assembly 522 includes the unit interface 212.

Another module is the circuit card 536 which performs the processing for various sensors. Sensor information can be processed on the circuit card using the analysis engine 204 and/or processed in the cloud using the system analyzer 204. Sensor information is gathered and analyzed over hours and days to find weak signals in the data indicating usage, leaks and other issues. The circuit card 536 might recognize sensor samples of interest and upload those to the cloud analyzer 108 for deeper learning. The circuit card and cloud analyzer can use artificial intelligence, genetic algorithms, fuzzy logic, and machine learning to recognize the condition and state of the plumbing system 116.

This embodiment includes three temperature sensors 512 to measure the ambient temperature with a sensor near the outside of the enclosure and away from the internal electronics and water temperature of the water in the pipe 420 in two locations. A first temperature sensor 512-1 measures water temperature in contact with the water as it enters the pipe 420 of the water device 120 away from any heat that the various circuits might generate. A second temperature sensor 512-2 measures water temperature at a second location away from the first temperature sensor 512-1. Based upon readings of the two water temperature sensors 512-1, 512-2, the heat generated by the water device 120 can be algorithmically corrected for. Some embodiments may only use a single water temperature sensor and/or forgo the ambient temperature sensing. Ambient temperature may be measured by other equipment in the building and made available over the network 134, for example, the thermostat, smoke detectors, point interface(s) 124 can measure ambient temperature and provide it to other equipment in the building 112.

This embodiment includes an electronically actuated shut-off valve 532. The shutoff valve 532 can be used to prevent flooding for leaks downstream of the water device 120. Additionally, the shutoff valve 532 can aid in detecting leaks. Closing the shutoff valve 532 and detecting a falling pressure is indicative of a leak downstream. Some embodiments can partially close the shutoff valve 532 to regulate pressure downstream.

A flow sensor 528 is used to measure the flow in the pipe 420. In this embodiment, an ultrasonic flow sensor is used, but other embodiments could use a rotameter, variable area flow meter, spring and piston flow meter, mass gas flow meters, turbine flow meters, paddlewheel sensors, positive displacement flow meter, and vortex meter. Generally, these meters and sensors cannot measure very small flows in a pipe in a practical way for building deployments.

The circuit card 536 is coupled to a pressure sensor 524 coupled to the water in the pipe 420. Readings from the pressure sensor are used to test the PRV, well pump, water supply, and pipe for leaks as well as identify normal egress from the water fixtures and appliances. Pressure and temperature vary with flow such that the pressure sensor 524 and temperature sensor 512-1, 512-2 can be used to detect flow as small as tiny leaks under certain circumstances. The circuit card 536 observes trends in the sensor data, performs spectral analysis, pattern matching and other signal processing on the sensor data.

Figure 6A:
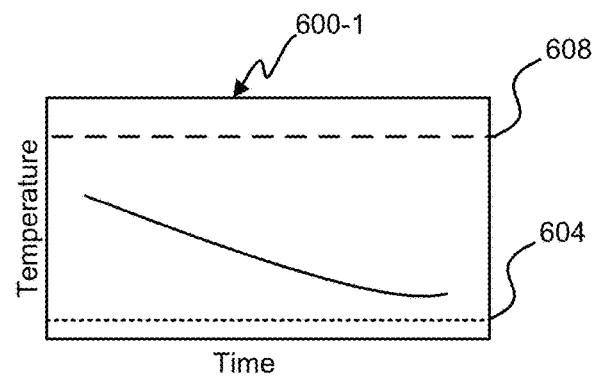
FIGS. 6A and 6B depict charts for different temperature sensing conditions.

With reference to FIG. 6A, a chart 600-1 showing an embodiment of a leak condition is shown with temperature data over time. In a situation where the building 112 is warmer than the water supply, flow in the plumbing system 116 will cause the temperature to fall from the ambient indoor temperature 608 to the water supply temperature 604. The slope of the fall increases with the spread in temperature difference and the rate of consumption from the municipal water system 128. Algorithms to detect leak only activate when intentional usage is not present.

Figure 6B:
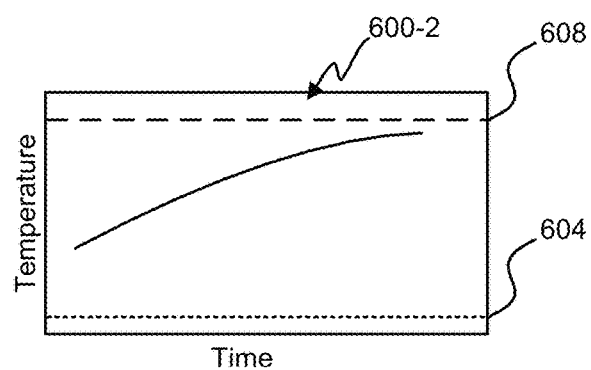

Referring next to FIG. 6B, a chart 600-2 showing an embodiment of a no leak condition is shown with temperature data over time. The measured temperature in the plumbing system 116 will generally rise to the ambient indoor temperature 608 in the absence of any intentional flow or any leak. Typically, the sensor readings are far noisier than depicted in the charts which show a highly smoothed version.

Figure 7A:
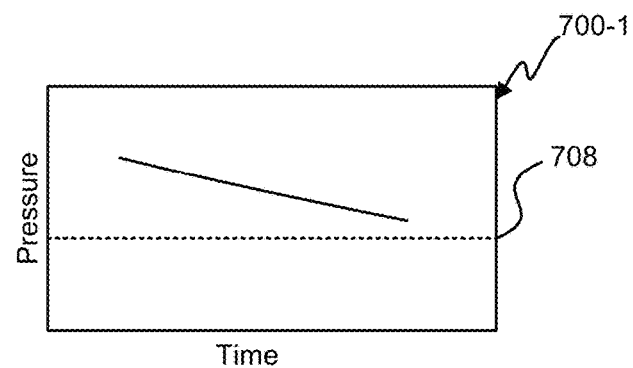
FIGS. 7A and 7B depict charts for different pressure sensing conditions.

With reference to FIG. 7A, a chart 700-1 showing an embodiment of a leak condition is shown with pressure data over time. There is a pressure threshold 708 for houses with a PRV or well where the water main or well pump will activate when the pressure in the plumbing system 116 falls below the pressure threshold 708. With intentional usage or a leak, the pressure will drop until the plumbing system 116 is pressurized by the PRV opening or the pump activating.

Figure 7B:
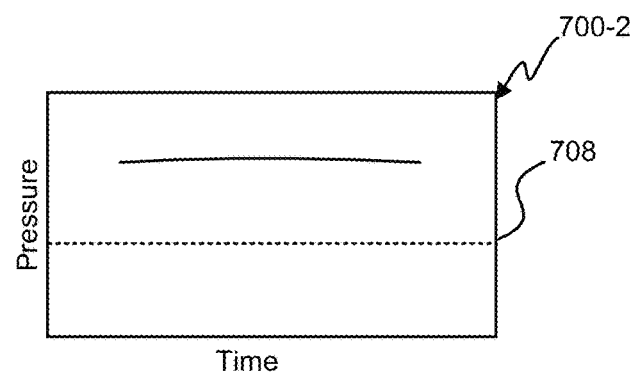

Referring next to FIG. 7B, a chart 700-2 showing an embodiment of a no leak condition is shown with pressure data over time. Generally, the plumbing system 116 will remain pressurized so long as there is no intentional or unintentional egress. For buildings without a PRV, the pressure fluctuates as neighbors and other users of the municipal water system 128 activate their fixtures and appliances.

Figure 8:
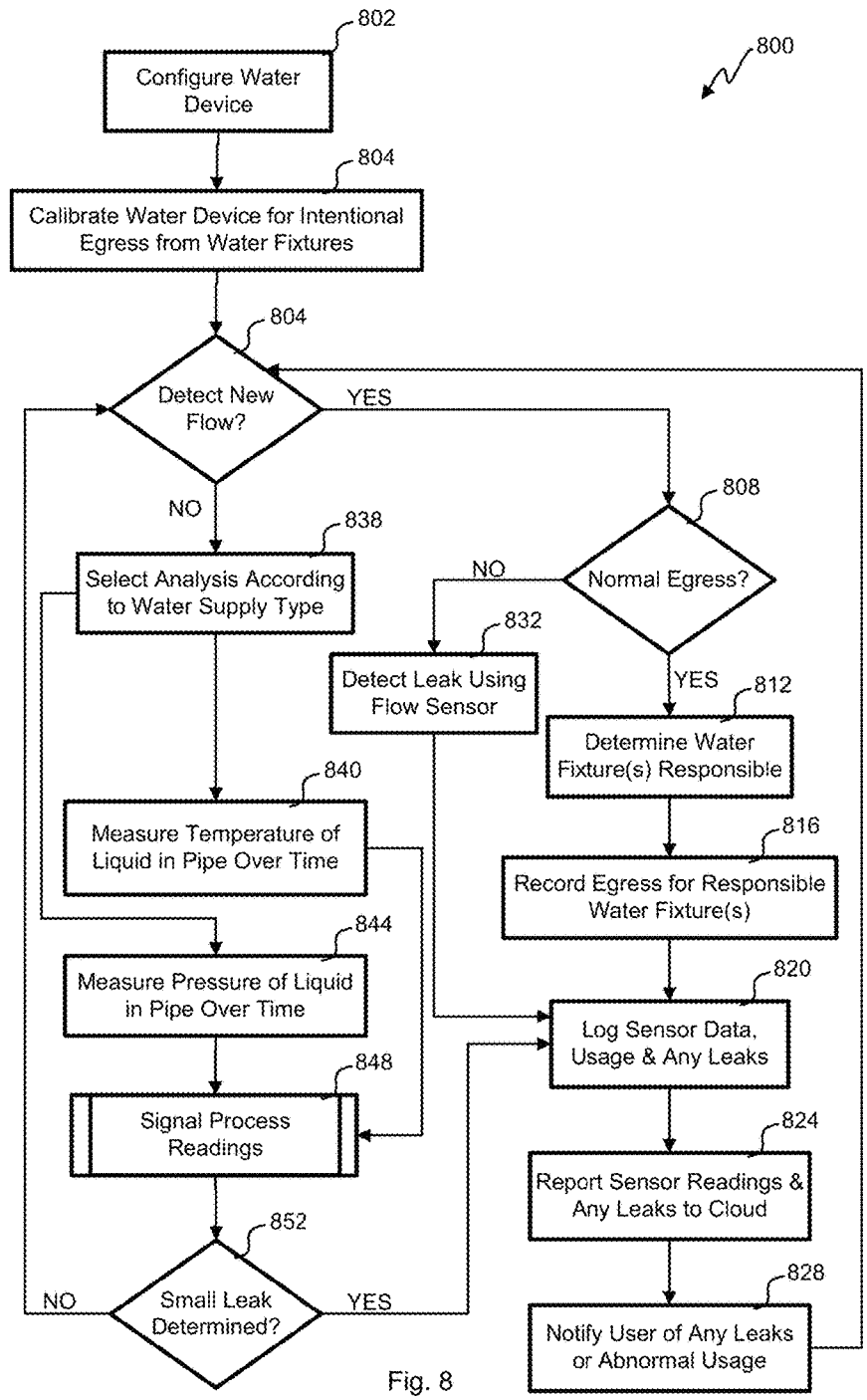
FIG. 8 illustrates a flow chart of an embodiment of a process for detecting leaks.

With reference to FIG. 8, a flow chart of an embodiment of a process 800 for detecting leaks is shown. The depicted portion of the process 800 begins in block 802 where the water device 120 is configured. This includes installation that couples the water device 120 physically to the plumbing system 116. Power is run to the water device 120 along with a connection to the network 134. The water device 120 is enrolled into an account with the cloud analyzer 108. Information about the building 112, demographic information about the account owner, etc. are all entered with the user device 130.

Once the physical installation and account configuration is done, the water device 120 is configured to detect the topology of the plumbing system 116 in block 804. Using signal processing the user activates each fixture and appliance in succession to enroll its signature. Over time, the water device 120 in conjunction with the cloud analyzer 108 processes sensor data to more accurately detect intentional water egress. In block 804, the flow sensor detects new flow. Where determined to be normal intentional egress in block 808 the responsible water fixture(s) and/or appliance(s) responsible are determined in block 812. The usage is recorded in block 816. The sensor data, usage, leaks are logged at the water device 120. In block 820, relevant sensor readings, processed information and any errors and leak conditions are reported to the cloud analyzer 108. Push or pull messages are sent to the user device 130 for any leaks, abnormal usage or other errors.

Where the egress is not determined normal in block 808, processing continues to block 832. Abnormal egress 808 is where the flow sensor 528 detects flow that doesn't correspond to any known fixture or appliance. This could correspond to a change in the plumbing system 116 so when the user receives the error, they can correct the system noting the change to the plumbing system 116 to avoid false alarms in the future. Processing continues after the suspect leak is detected in block 832 to block 820.

Where there is no flow detected by the flow sensor back in block 804, small leak detection is performed. In block 838, the algorithm used for testing varies upon what type of water supply and water source. For example, the algorithm used for well water is different from one used for a building using the municipal water system without a PRV being for the building 112. The various pressure and temperature sensors 524, 512 gather data over time in blocks 840 and 844 as separate processes. The sensor readings are analyzed using various signal processing techniques in block 848 as fully detailed in FIGS. 9A-9C below. Where a small leak is detected processing continues to block 820 and to block 804 where no leak is detected.

Figure 9A:
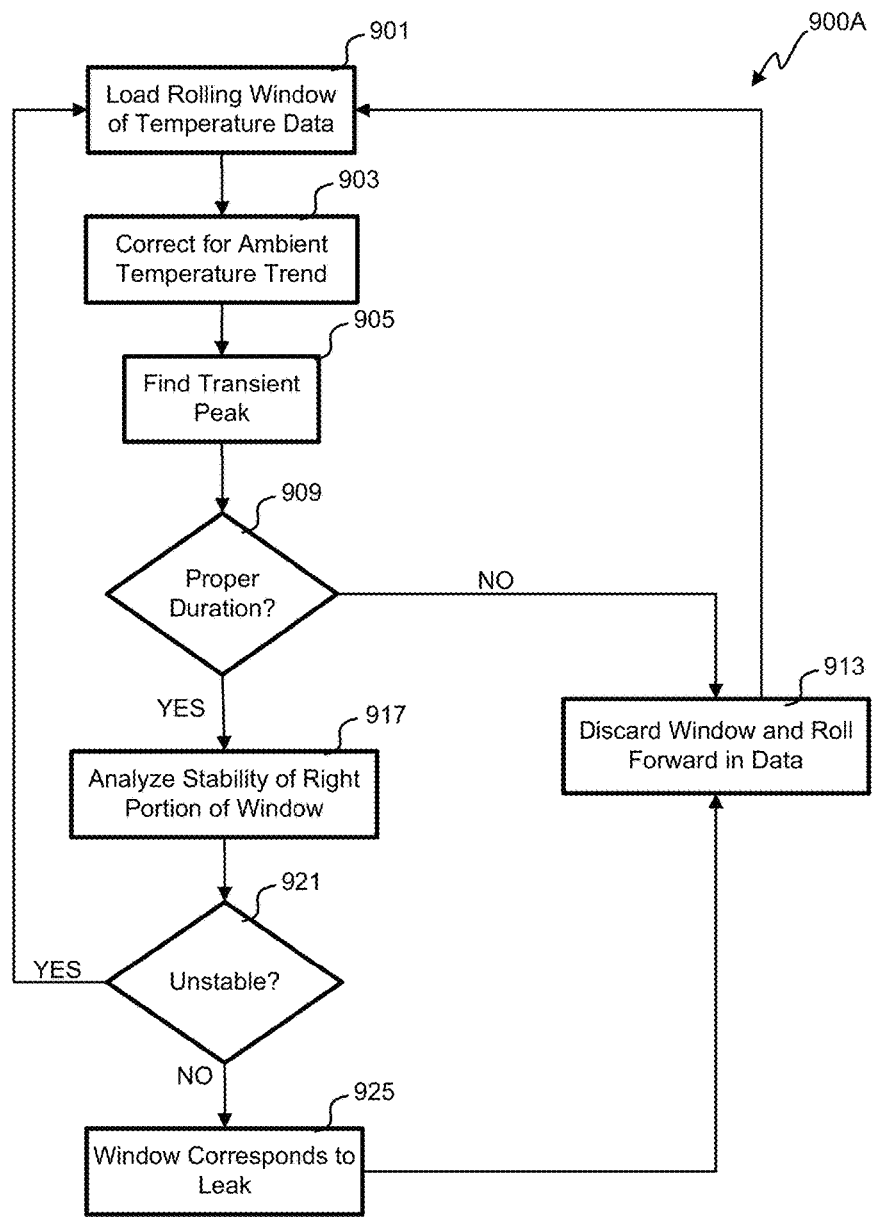
FIG. 9A illustrates a flow chart of an embodiment of a process for analyzing temperature sensor readings to detect a leak.

Referring next to FIG. 9A, a flow chart of an embodiment of a process 900A for analyzing temperature sensor 512 readings is shown. This process 900A runs continuously where there is no intentional egress detected. The process 900A may run in parallel to leak detection using pressure sensor data as described in FIGS. 9B and 9C below. Either the temperature sensing or pressure sensing can independently result in a leak determination in this embodiment. But, other embodiments score each parallel determination and weigh those scores to produce a combined score that results in a leak determination when the composite score is beyond a composite threshold.

The depicted portion of the process begins in block 901 where a rolling window of temperature data is loaded into the analysis engine 204. The window can be 2 hours, 3 hours, 4 hours, 5 hours, 6 hours, 7 hours or more in different embodiments. Where there is a change in ambient temperature that would affect measurement of the water in the plumbing system 116, it is corrected for in block 903. The temperature inside the building 112 or outdoors can affect the water temperature in the pipes. A model of those changes is built over time for different temperature trends so that it can be removed from the data in block 903. In this embodiment, a transient peak typically appears near the beginning of a downslope in temperature readings as the water falls to the water supply temperature 604 and those transient peaks are detected in block 905. The duration of the downsloping trend is tested in block 909. Where the trend is too small, it is discarded in block 913 as the window of analysis moves forward through the temperature data before looping back to block 901. A downtrend less than 10, 20, 40 60, or 90 minutes is discarded in various embodiments.

Where the downtrend is of the correct duration as determined in block 909, the right portion of the window is analyzed for stability in block 917. Generally, leaks are consistent, stable and occasionally increasing in flow. A determination is made in block 921 of whether the right portion of the window is stable and consistent in its downslope. Where determined unstable in block 921, processing loops back to block 901. When the right portion of the window is stable processing continues to block 925 where a leak is determined before rolling forward in the data in block 913 to look for more leak conditions. This process continues such that small leaks are continuously searched for when there is no intentional egress from the plumbing system 116. Some embodiments rely on temperature sensing to detect leaks, while other embodiments use pressure sensing as explained below, still other embodiments use both temperature and pressure sensing algorithms to detect leaks in parallel.

Figure 9B:
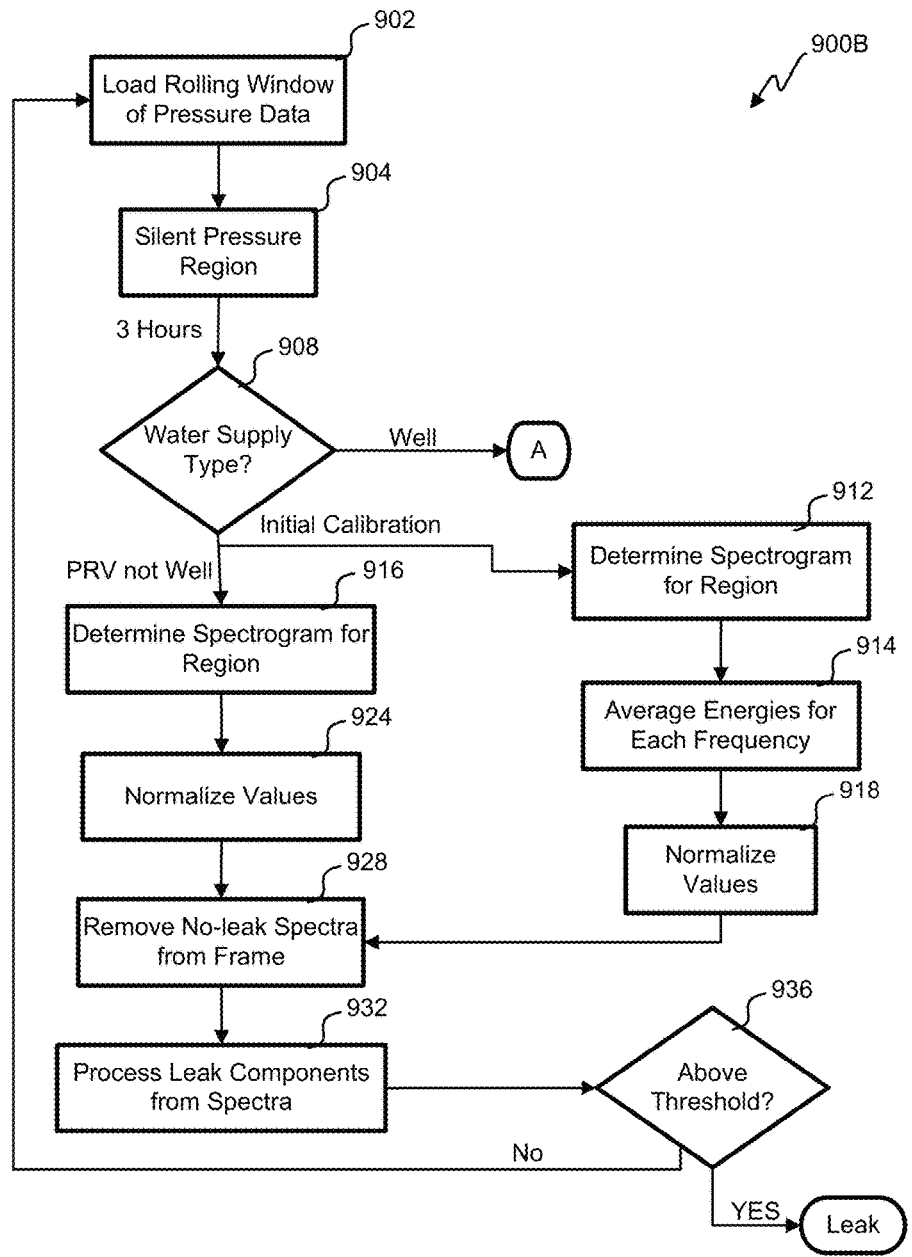
FIGS. 9B-9C depict flow charts of an embodiment of a process for analyzing pressure sensor readings to detect leaks.
Figure 9C:
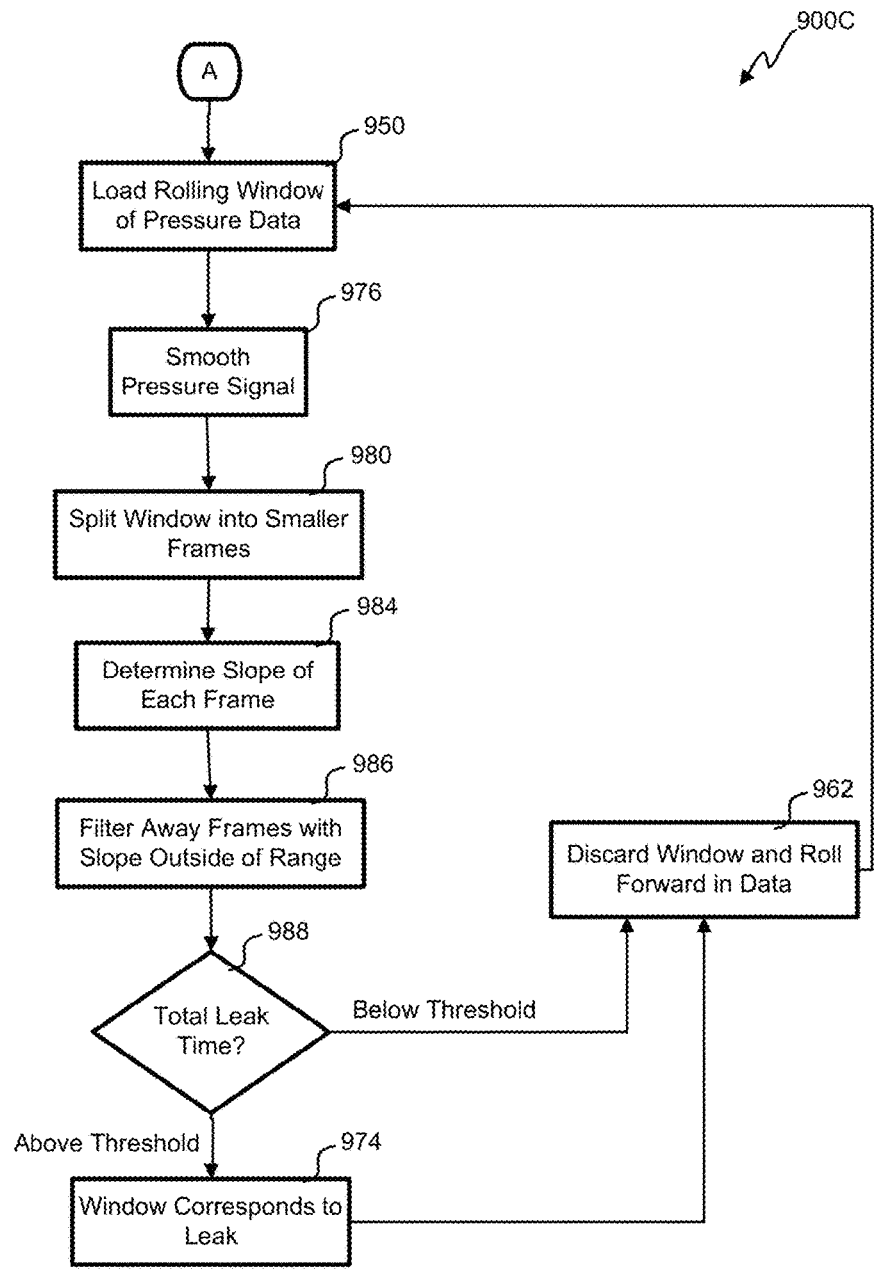

Referring next to FIGS. 9B and 9C, a flow charts of an embodiment of a process 900B, 900C for analyzing pressure sensor 524 readings is shown. Two different types of pressure sensor analysis are possible depending on whether the building 112 has a PRV or well water. With reference initially to FIG. 9B, the depicted portion of the process begins in block 902 where a rolling window of pressure data is loaded for analysis. This embodiment begins the pressure sensor 524 analysis after three hours of the pressure readings that do not register any intentional egress from the plumbing system 116. Other embodiments could have a different period such as 2, 4, 5, 6, or 7 hours. Where it is determined in block 908 that the water supply type is well water, processing goes to block 950 of FIG. 9C.

Where there is a PRV to buffer spectral components of pressure from the municipal water system 128 or well water supply as determined in block 908, processing continues to block 912 for an initial calibration presumably where there is no leak condition. Should a leak be determined with the temperature sensing algorithm of FIG. 9A, the calibration is discarded and performed again where there is no leak. In block 912, the pressure sensor data is converted to the frequency domain. Over the sensor window, the energies are averaged at each frequency in block 914 before normalization in block 918. The spectrogram of the plumbing system 116 without a leak once determined can be removed from future spectral analysis.

At a time after initial calibration to determine the background spectra, the spectra for the possible leak region is determined in block 916 for the pressure sensor 524 data in the window. The frequency domain values are normalized in block 924. The background spectra are removed from the possible leak spectra in block 928. The remaining spectral components are analyzed in block 932. The remaining spectral components can be added together to see if it exceeds a predetermined threshold. The leak adds unique spectral components that when present and over a threshold are determined a leak in block 936. Where a leak is not determined, processing loops back to block 902 to roll the analysis window forward in time.

Referring next to FIG. 9C, a flow chart 900C for an embodiment of a leak detection algorithm is shown that is used for buildings 112 using well water. Typically, a PRV is not present when on a well, but a pump is used to pull the well water from the ground. A pump in the well pumps water through one or more check valves and into the building 112. When there is no water demand, the check valve(s) is closed to maintain a constant pressure in the plumbing system 116. As egress occurs, pressure in the plumbing system 116 decreases until a cracking pressure opens the check valve(s) to supply more water. When the lower limit of the pressure threshold is reached, the pump activates to pressurize the plumbing system 116 and supply well water. Where there is intended egress or a leak, the pressure varies in a saw tooth pattern over time. The depicted portion of the process 900C begins in block 950 where a two hour window of pressure sensor readings are loaded for analysis. Other embodiments could load windows of different sizes.

The pressure readings are smoothed in block 976 before splitting the window into smaller frames of thirty seconds. Other embodiments could use 15, 45, 60, 90, 120, or 150 second frames. Each of the frames has its slope determined in block 984. Any frames corresponding to the pump being active are filtered out along with frames without significant enough slope that it could be a leak in block 986. What remains are frames that have a slope that corresponds to a leak condition.

In block 988, the frames that are possible leaks are counted, and that count is compared with a threshold. Where the count is below a threshold, the variance in pressure is attributed to noise and processing loops back to block 962 where the window is discarded before fetching another window. Where a significant count exists of frames that have slopes like a leak above a threshold, a leak is determined in block 974 before looping back to block 962.

A number of variations and modifications of the disclosed embodiments can also be used. For example, the plumbing analyzer can be used to monitor any liquid distributed in pipes. This could include industrial plants, sprinkler systems, gas distribution systems, refineries, hydrocarbon production equipment, municipal water distribution, etc. The plumbing system is a closed system with pressurized liquid (e.g., a gas) that is released in a selective and controlled manner using valves.

In systems where there is no PRV or a poorly functioning one, leaks can be detected by shutting off the water supply to the plumbing system. The pressure will fall off from the plumbing system as the water leaks from the plumbing system. Shutting off the water supply can be done by the water device in some embodiments. As shut off can be inconvenient to occupants, this test can be done at times where normal egress is unlikely to happen. When normal egress does happen, the water supply can be turned on again to quickly provide for normal egress. In some embodiments, when leaks are detected with the algorithms in FIGS. 9A-9C that conclusion might be confirmed with a pressure test after shut off of the water.

Pressure will change with thermal expansion of the plumbing system 116. With the pipes largely being in the walls of the building 112, they are affected by the interior and exterior temperatures. The interior temperature can be measured at the water device 120 or through communication with the HVAC system and the exterior temperature can be determined using the location of the building 112 with third party weather information. The effect of thermal expansion as a function of these the delta of these two temperatures can be modeled over time. In some embodiments, the effect of thermal expansion is removed from the pressure sensor readings, for example, homes with functioning PRVs.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method for detecting small leaks of liquid in a plumbing system, the method comprising:
   measuring liquid flow within a pipe of the plumbing system with a flow sensor, wherein the flow sensor does not measure temperature;
   determining algorithmically using the flow sensor that there is no intentional liquid egress from the plumbing system caused by an open water fixture;
   measuring temperature of the liquid over time at a point in the plumbing system upstream from a leak while there is no intentional liquid egress and no measured liquid flow as measured by the flow sensor;
   processing measured temperature over time to determine whether a decay of the measured temperature exceeds a threshold decay of liquid in the plumbing system; and
   transmitting a leak detected signal when the decay exceeds the threshold decay.

2. The method for detecting small leaks in a plumbing system as recited in claim 1, wherein the processing step uses signal processing techniques to match the measured temperature to a leak profile.

3. The method for detecting small leaks in a plumbing system as recited in claim 1, the method further comprising:
   measuring temperature at a second point of the plumbing system;
   processing a second measured temperature at the second point; and
   correcting the processing the measured temperature using the second measured temperature.

4. The method for detecting small leaks in a plumbing system as recited in claim 3, wherein the measuring temperature at the second point is measuring air temperature away from the liquid.

5. The method for detecting small leaks in a plumbing system as recited in claim 1, the method further comprising:
   determining air temperature within a building hosting the plumbing system, wherein the decay is a function of the air temperature.

6. The method for detecting small leaks in a plumbing system as recited in claim 1, wherein a thermal mass of the plumbing system is determined over time to determine the predicted decay.

7. The method for detecting small leaks in a plumbing system as recited in claim 1, wherein flow through the leak in the pipe is below a perceptible limit of the flow sensor.

8. A water device for detecting small leaks of liquid in a plumbing system, the water device comprising:
   one or more processors; and
   one or more memories, wherein the one or more memories have machine readable instructions to:
      measure liquid flow within a pipe of the plumbing system with a flow sensor, wherein the flow sensor does not measure temperature;
      determine algorithmically using the flow sensor that there is no intentional liquid egress from the plumbing system caused by an open water fixture;
      measure temperature of the liquid over time at a point in the plumbing system upstream from a leak while there is no intentional liquid egress and no measured liquid flow as measured by the flow sensor;
      process measured temperature over time to determine whether a decay of the measured temperature exceeds a threshold decay of liquid in the plumbing system; and
      transmit a leak detected signal when the decay exceeds the threshold decay.

9. The water device for detecting small leaks of liquid in the plumbing system as recited in claim 8, wherein the process of measured temperature over time uses signal processing techniques to match the measured temperature to a leak profile.

10. The water device for detecting small leaks of liquid in the plumbing system as recited in claim 8, the one or more memories further having instructions to:
    measure temperature at a second point of the plumbing system;
    process a second measured temperature at the second point; and
    correct the processing the measured temperature using the second measured temperature.

11. The water device for detecting small leaks of liquid in the plumbing system as recited in claim 8, the one or more memories further having instructions to:
    determine air temperature within a building hosting the plumbing system, wherein the decay is a function of the air temperature.

12. The water device for detecting small leaks of liquid in the plumbing system as recited in claim 8, wherein a thermal mass of the plumbing system is determined over time to determine the predicted decay.

13. The water device for detecting small leaks of liquid in the plumbing system as recited in claim 8, wherein flow through the leak in the pipe is below a perceptible limit of the flow sensor.

14. One or more non-transitory machine-readable mediums for detecting small leaks in a plumbing system having machine-executable instructions configured to:
    measure liquid flow within a pipe of the plumbing system with a flow sensor, wherein the flow sensor does not measure temperature;
    determine algorithmically using the flow sensor that there is no intentional liquid egress from the plumbing system caused by an open water fixture;
    measure temperature of the liquid over time at a point in the plumbing system upstream from a leak while there is no intentional liquid egress and no measured liquid flow as measured by the flow sensor;
    process measured temperature over time to determine whether a decay of the measured temperature exceeds a threshold decay of liquid in the plumbing system; and
    transmit a leak detected signal when the decay exceeds the threshold decay.

15. The one or more non-transitory machine-readable mediums for detecting small leaks in a plumbing system as recited in claim 14, wherein the processing step uses signal processing techniques to match the measured temperature to a leak profile.

16. The one or more non-transitory machine-readable mediums for detecting small leaks in a plumbing system as recited in claim 14, having machine-executable instructions configured to:
    measure temperature at a second point of the plumbing system;
    process a second measured temperature at the second point; and
    correct the processing the measured temperature using the second measured temperature.

17. The one or more non-transitory machine-readable mediums for detecting small leaks in a plumbing system as recited in claim 16, wherein the measuring temperature at the second point is measuring air temperature away from the liquid.

18. The one or more non-transitory machine-readable mediums for detecting small leaks in a plumbing system as recited in claim 14, having machine-executable instructions configured to:
   determine air temperature within a building hosting the plumbing system, wherein the decay is a function of the air temperature.

19. The one or more non-transitory machine-readable mediums for detecting small leaks in a plumbing system as recited in claim 14, wherein a thermal mass of the plumbing system is determined over time to determine the predicted decay.

20. The one or more non-transitory machine-readable mediums for detecting small leaks in a plumbing system as recited in claim 14, wherein flow through the leak in the pipe is below a perceptible limit of the flow sensor.

\* \* \* \* \*